United States Patent [19]
Ishii et al.

[11] 3,793,146
[45] Feb. 19, 1974

[54] PROCESS FOR THE PRODUCTION OF CITRIC ACID

[75] Inventors: Kazumitsu Ishii; Yoshikazu Nakajima; Tatsuya Iwakura, all of Tokyo, Japan

[73] Assignee: Mitsui Sugar Co., Ltd., Tokyo, Japan

[22] Filed: Nov. 15, 1971

[21] Appl. No.: 198,966

[30] Foreign Application Priority Data
Nov. 26, 1970 Japan.............................. 45-104247

[52] U.S. Cl..................................... 195/37, 195/47
[51] Int. Cl............................................... C12c 1/00
[58] Field of Search....... 195/28, 29, 30, 47, 49, 37, 195/57

[56] References Cited
UNITED STATES PATENTS
3,622,455   11/1971   Iizuka et al. .......................... 195/37
3,632,476   1/1972   Fried..................................... 195/37

FOREIGN PATENTS OR APPLICATIONS
1,199,700   7/1970   Great Britain........................ 195/28

*Primary Examiner*—A. Louis Monacell
*Assistant Examiner*—Thomas G. Wiseman
*Attorney, Agent, or Firm*—Stevens, Davis, Miller & Mosher

[57] ABSTRACT

A process for making citric acid is disclosed which is formed by inoculating a strain of Candida oleophilia to a culture medium of a waste glucose solution containing a high calcium ion and chloride ion content formed by adding calcium chloride to a mixed sugar solution of fructose and glucose. The fructose-calcium chloride addition compound is precipitated out and the remaining solution is employed as the culture medium for producing citric acid. High yields of the citric acid on an industrial scale result.

1 Claim, No Drawings

PROCESS FOR THE PRODUCTION OF CITRIC ACID

This invention relates to a fermentative process for the production of citric acid from a sugar solution. More particularly, this invention relates to a microbiological process for the production of citric acid from a waste solution which is formed by the separation of fructose from a sugar solution containing both fructose and glucose.

A process for the production of fructose, which comprises reacting calcium chloride with a sugar solution containing both fructose and glucose, for example, a sugar solution obtained by the acid inversion of sucrose thereby to precipitate a fructose-calcium chloride addition product (in which 1 molecule of $CaCl_2$ and 2 molecules of $H_2O$ are added to 2 molecules of fructose) in crystalline form, has been described in the Japanese Patent Publication No. 26048/1970 and is thus now well known.

We have proposed a process for obtaining high purity crystals of a fructose-calcium chloride addition compound in a high yield by adjusting the pH value of the mixed solution to 1.5 – 4.5.

A filtrate separated from the crystals of the fructose-calcium chloride addition product according to the preceding process contains a large quantity of calcium chloride as well as a quantity of glucose. Thus, the filtrate is an acidic solution and therefore cannot be utilized as it is in any way. For example, when a solution of inverted sugar is adjusted to pH 1.5 – 4.5 and in which 25 – 40 percent by weight, based on the inverted sugar, of $CaCl_2 \cdot 2H_2O$ has been dissolved and then the solution is concentrated and cooled with mild agitation, high purity crystals of a fructose calcium chloride addition compound can be obtained. The filtrate separated from the crystal by means of centrifugal separation contains solids comprising about 71 percent of glucose, about 9 percent of fructose and about 20 percent of $CaCl_2$. It is of course known that glucose can be recovered by desalting the waste solution with an ion exchange resin. However, because such a large quantity of calcium chloride is contained in the waste solution, a large amount of ion exchange resin is required for recovering glucose and, furthermore, the ion exchange resin used for such treatment will be regenerated with difficulty. Thus, the treatment with the ion exchange resin is disadvantageous from an economic viewpoint.

In pursuance of our extensive investigation for a more convenient method for the utilization of the above waste solution, we have arrived at the present invention.

According to the present invention, the aforementioned glucose solution which contains a large quantity of calcium chloride can be utilized as it is as the starting material for the production of citric acid without requiring any further treatment.

With regard to the production of citric acid by the fermentative process using a sugar solution as the starting material, various processes have been described. According to one process, it is suggested that an increased yield is achieved when a neutral salt such as calcium carbonate, calcium acetate and sodium acetate is added to the culture medium or when an alkali such as caustic soda and calcium hydroxide is added during the incubation stage to neutralize the resulting citric acid. However, the utilization of a starting material which contains a large quantity of an acidic salt such as calcium chloride as it is for the fermentative process has not been described previously.

We have intended to produce citric acid by a fermentative process, using a sugar solution containing a large quantity of calcium chloride as it is as the culture medium. After considerable research, we have found that a certain strain of Genus Candida grows very well in such culture medium permitting citric acid to be obtained in a high yield.

Typical examples of the strain usable in the present invention include Candida oleophila, Candida guilliermondii, Candida tropicalis, Candida mycoderma, Candida lipolytica and Candida melibiosi. It is of course apparent that various variants of the above strains can also be used conveniently in this invention.

Each of the above strains is already known and therefore easily available.

In practising the fermentation according to the present invention, the sugar solution containing a large quantity of calcium chloride is used as a culture medium by adding a suitable nitrogen source and a suitable nutrient source. As the nitrogen source, ammonia, urea, various inorganic or organic ammonium salts such as ammonium chloride, ammonium sulfate and ammonium acetate, and organic substances such as peptone, meat extract, yeast extract, corn steep liquor, fish meal, defatted soybean cake can be used alone or as a mixture of two or more of the above materials.

Conveniently, a phosphate, magnesium salt or the like which is required for the growth of the strain is added to the culture medium. Further, the growth of the strain can be accelerated by the addition of vitamins such as thiamine and nicotinic acid.

Preferred pH value of the culture medium is approximately 4.5 – 6.5 and conveniently the pH value resides on the acidic side. The fermentation is carried out at normal temperature or a temperature up to 32° C according to any of aerobic surface culture, shaken culture and aerobic submerged culture techniques. Submerged culture accompanied with aeration agitation is particularly convenient for the fermentation of this invention. Further, the fermentation may be carried out in either a batch system or a continuous system.

The following examples will illustrate the present invention.

Example 1

In a sugar solution comprising 65 parts by weight of fructose and 35 parts by weight of glucose were dissolved 38 parts by weight of $CaCl_2 \cdot 2H_2O$. The resulting solution was adjusted to pH 1.5 – 4.5 with hydrochloric acid and then concentrated to precipitate fructose-calcium chloride addition compound as crystal. After the crystal was collected by centrifugal separation, a waste sugar solution having the composition as shown in the Table 1 below was obtained.

Table 1

| Composition of the waste sugar solution | |
|---|---|
| fructose | 3.0% |
| glucose | 32.6% |
| total sugar content | 35.6% |
| $CaCl_2$ | 8.8% |
| pH | 3.2 |

6.7 kg of the above waste sugar solution were diluted with about 3 liters of water and the dilute solution was sterilized by boiling in a 30 litre-jar fermenter. After the solution was cooled to 28° C, 120 g of corn steep liquor, 10.9 g of urea, 2.4 g of $KH_2PO_4$, 2.4 g of $MgSO_4 \cdot 7H_2O$ and 3.0 g of $MnSO_4 \cdot nH_2O$ were added, each in the form of a sterilized aqueous solution. Further, 1.4 kg of dry sterilized $CaCO_3$ were added and then sterile water was added to make the volume of the solution to 12.0 litres. The pH value of the solution thus prepared was adjusted to 6.2 with caustic soda solution.

On the other hand, a strain of Candida oleophila (ATCC 20177) was incubated by means of shaken culturing procedure in a seed culture medium comprising 100 ml of water, 5.0 g of glucose, 0.5 g of yeast extract, 0.02 g of $KH_2PO_4$, 0.02 g of $MgSO_4 \cdot 7H_2O$ and 1.0 g of $CaCO_3$, to give an inoculum. 600 ml of the inoculum thus obtained were inoculated in the main culture medium above described.

After the inoculation was completed, the main culture medium was incubated under the conditions of 4 litres/min. of aeration, 300 r.p.m. of agitation speed and 28° C of temperature.

Fermentation was continued for 5 days. The sample was observed daily. The results obtained by the analysis of the broth were as shown in the following Table 2.

Table 2

| Composition of the broth corresponding to incubation period (1) | | | |
|---|---|---|---|
| Incubation period (days) | Sugar content (calculated as glucose) (g/100 g) | Number of microorganisms (cells/ml) | Citric acid (anhydride) (g/100 g) |
| 0 | 16.1 | $2.0 \times 10^7$ | 0 |
| 1 | 13.9 | $4.2 \times 10^8$ | — |
| 2 | 10.1 | $8.0 \times 10^8$ | 1.9 |
| 3 | 6.7 | $9.8 \times 10^8$ | 5.0 |
| 4 | 2.9 | — | 8.5 |
| 5 | less than 0.2 | — | 10.9 |

After 5 days fermentation 15.4 kg of broth were obtained. The broth was observed containing 1.68 kg of citric acid as calcium salt. This corresponds to 70.5 percent of yield based on 2.38 kg of the total sugar content of the starting material.

The broth was then subjected to filtration to separate calcium citrate together with yeast. The separated precipitate of calcium citrate and yeast was washed thoroughly with water and then re-suspended in a small amount of water. To the suspension was added sulfuric acid to liberate citric acid, then the yeast and calcium sulfate were filtered off to give a citric acid solution. The solution was concentrated and a small amount of calcium sulfate further precipitated was eliminated. After further concentration citric acid monohydrate was crystallized from the concentrate. The crystal thus obtained was recovered by centrifugal filtration and the mother liquor was further concentrated and subjected to the crystallization. By these crystallization, 1.58 kg of crude citric acid monohydrate crystal were obtained in total, the average purity thereof being 99.5 percent. The mother liquor obtained at the third crystallization was diluted to five-fold of the volume, neutralized with $Ca(OH)_2$ and then heated to precipitate calcium citrate. The precipitated calcium citrate was separated by filtration and dried to give 255 g of crude calcium citrate. In the crude calcium salt, the content of citric acid anhydride was 58.8 percent.

Thus, this means that 94.9 percent of citric acid which has been contained in the broth was recovered.

Example 2

5.35 kg of the same waste sugar solution as used in the Example 1 were diluted with about 4 litres of water and the dilute solution was sterilized by boiling in a 30 litre-jar fermenter. After the solution was cooled to 28° C, 120 g of corn steep liquor, 10.9 g of urea, 2.4 g of $KH_2PO_4$, 2.4 g of $MgSO_4 \cdot 7H_2O$ and 3.0 g of $MnSO_4 \cdot nH_2O$ were added each in the form of a sterilized aqueous solution. Further, 1.1 kg of dry sterilized $CaCO_3$ were added and finally sterile water was added to make the volume of the solution to 12.0 litres. The pH value of the solution thus prepared was adjusted to 6.2 with caustic soda solution.

Thus prepared culture medium were inoculated with 600 ml of inoculant culture of Candida oleophila which had been prepared similarly as in Example 1 and incubation was effected under the conditions of 4 litres/min. of aeration, 300 r.p.m. of agitation speed and 28° C of temperature.

On the third day of the incubation, 1.10 kg of the same sugar solution as above, which had been sterilized and adjusted to pH 5.5 with caustic soda solution and 0.2 kg of dry sterilized $CaCO_3$ were further added to the above incubated liquor. The results of analysis during the incubation were as shown in the following Table 3.

Table 3

| Composition of the broth corresponding to incubation period | | | |
|---|---|---|---|
| Incubation period (days) | Sugar content (calculated as glucose) (g/100g) | Number of microorganisms (cells/ml) | Citric acid (anhydride) (g/100g) |
| 0 | 13.5 | $2.2 \times 10^7$ | 0 |
| 1 | 10.8 | $6.7 \times 10^8$ | — |
| 2 | 6.0 | $9.4 \times 10^8$ | 3.1 |
| 3 (before addition of further sugar) | 1.6 | $9.8 \times 10^8$ | 7.1 |
| 3 (after addition of further sugar) | 3.9 | $9.0 \times 10^8$ | 6.5 |
| 4 | less than 0.2 | — | 10.1 |

In the case of this Example, the fermentation was completed in 4 days and 16.0 kg of broth were obtained. The amount of citric acid (anhydride) precipitated in the broth as the calcium salt was 1.61 kg which corresponds to 70.1 percent of yield based on 2.30 kg of the total sugar content in 6.45 kg of the sum of the above sugar solution used for the fermentation.

By the similar manner as described in the Example 1, 1.52 kg of crude crystal (99.5 percent purity) of citric acid monohydrate and 235 g of crude calcium citrate (containing 60 percent of citric acid anhydride) were obtained. This means that 94.4 percent of citric acid which had been contained in the broth were recovered.

From the foregoing results, it will be understood that the following advantages were achieved by the process of this invention:

A waste glucose solution which is obtained in the separation of fructose-calcium chloride addition product from a sugar solution containing both glucose and fructose and consequently contains a large quantity of calcium chloride can be effectively utilized, thus a considerable decrease in cost for the production of fructose can be realized and, in addition, the following advantages are attained in the production of citric acid from the above waste solution:

1. Previous treatments such as inversion of the sugar and purification of the starting sugar solution are not required.
2. Citric acid is obtained at a high yield, namely, whereas yield of citric acid produced from cane molasses is about 65 percent based on consumed sugar, the yield according to the present invention is more than 70 percent based on consumed sugar.
3. Less sugar remains in the culture medium.
4. Because of the absence of organic impurities such as a colour and colloidal substance in the product, the purifying treatments with activated charcoal, decolourizing ion exchange resin or the like are not required in the recovery of citric acid crystal from the broth and the crystalline citric acid can be obtained at a high yield.

We claim:
1. A process for the production of citric acid comprising adding calcium chloride to a mixed sugar solution of fructose and glucose to precipitate out fructose as a fructose-calcium chloride addition compound, separating the precipitated crystals of addition compound from the solution to leave a waste glucose solution containing high amount of calcium ion and chloride ion, preparing a culture medium with use of the waste glucose solution as it is to provide a culture medium, and then inoculating a citric acid-producing strain of Candida oleophilia species to the culture medium, incubating the organism in the medium to produce citric acid in the broth in high concentration and high yield and then recovering the citric acid from the broth.

* * * * *